(12) United States Patent
Walker

(10) Patent No.: US 11,583,142 B2
(45) Date of Patent: Feb. 21, 2023

(54) SELECTIVELY SECURABLE GRILL COVER

(71) Applicant: Modus Light, LLC, Overland Park, KS (US)

(72) Inventor: Joshua Drew Walker, Kansas City, MO (US)

(73) Assignee: Modus Light, LLC, Overland Park, KS (US)

( * ) Notice: Subject to any disclaimer, the term of this patent is extended or adjusted under 35 U.S.C. 154(b) by 278 days.

(21) Appl. No.: 16/881,075

(22) Filed: May 22, 2020

(65) Prior Publication Data

US 2021/0361117 A1    Nov. 25, 2021

(51) Int. Cl.
*A47J 37/07*    (2006.01)
*F16B 5/06*    (2006.01)
*F16B 1/00*    (2006.01)

(52) U.S. Cl.
CPC ......... *A47J 37/0786* (2013.01); *F16B 5/0607* (2013.01); *F16B 2001/0035* (2013.01)

(58) Field of Classification Search
CPC ... A47G 27/0206; A47J 37/0786; B41J 29/13; F24F 1/58; F24F 13/20
USPC .................................. 108/90; 150/165, 154
See application file for complete search history.

(56) References Cited

U.S. PATENT DOCUMENTS

| | | | |
|---|---|---|---|
| 5,379,495 A * | 1/1995 | Riceman | H01F 7/0263 24/303 |
| 6,058,658 A * | 5/2000 | Dunn | A47J 37/0786 52/DIG. 14 |
| 6,328,083 B1 * | 12/2001 | Esterson | A47J 37/0786 150/165 |
| 7,866,358 B1 * | 1/2011 | Simms, II | A47J 37/0786 126/201 |
| 8,701,652 B2 * | 4/2014 | Cross | A47J 37/0786 99/359 |
| 9,468,337 B2 * | 10/2016 | Simon | A47J 37/0786 |
| 9,596,958 B1 * | 3/2017 | Murphy | A47J 37/0786 |
| 11,002,035 B1 * | 5/2021 | Wells | E04H 15/32 |
| 2003/0196562 A1 * | 10/2003 | Trickett | A47J 37/0786 99/482 |
| 2009/0101256 A1 * | 4/2009 | Maruzzo | A47J 37/0786 150/165 |
| 2014/0113044 A1 * | 4/2014 | McIntire | A47J 37/0786 150/165 |
| 2021/0324656 A1 * | 10/2021 | Wells | E04H 15/02 |

* cited by examiner

*Primary Examiner* — Jose V Chen
(74) *Attorney, Agent, or Firm* — Shook, Hardy & Bacon, L.L.P.

(57) ABSTRACT

A grill cover is configured to be utilized with a grill having a metallic component, the grill cover includes a cover body, a magnetic fastener, and a secondary fastener. The cover body presents an outer edge disposed along a bottom side and a cover void therein configured to receive the grill therein. The magnetic fastener and the secondary fastener are each secured to the cover body. The magnetic fastener is configured to provide a magnetic force to keep the magnetic fastener selectively secured to the metallic component of the grill so as to keep the cover body in place around the grill therein. The secondary fastener is configured to reduce a cross-sectional area of the cover void so as to prevent the grill cover from being removed from the grill while the secondary fastener is emplaced.

17 Claims, 3 Drawing Sheets

SELECTIVELY SECURABLE GRILL COVER

FIELD OF THE INVENTION

The present disclosure generally relates to grill covers configured to be used with a standard barbecue grill.

BACKGROUND

Grills are utilized to cook food outdoors. Grill covers are utilized to provide protection for a grill or other outdoor cooking equipment. Because the grill typically spends most time out of doors, the grill is exposed to weather and other environmental factors to which other indoor cooking equipment is not exposed. The weather can include high winds, storms, and the like.

As such, it is common for grill covers of the prior art to become dislodged and blow away. To counter this, some grill covers of the prior art typically are fitted with various securing structures and/or are specifically fitted to a single model of grill. However, these securing structures require the user to emplace them correctly and securely every time. Further, the specifically fitted grill covers tend to be expensive.

What is lacking in the prior art is a grill cover that is a generic size and shape that is easy to emplace and secure. This background discussion is intended to provide information related to the present invention which is not necessarily prior art.

BRIEF SUMMARY

Embodiments of the invention solve the above-mentioned problem (as well as other problems) by providing a selectively securable grill cover that utilizes magnets to easily and quickly secure to the grill. The magnets are secured to a lower end of the grill cover so as to automatically secure to a metallic component of the grill when the grill cover is emplaced over the grill.

A first embodiment of the invention is broadly directed to a grill cover configured to be utilized with a grill having a metallic component, the grill cover comprising a cover body and a magnetic fastener. The cover body presents an outer edge disposed along a bottom side and a cover void therein configured to receive the grill therein. The magnetic fastener is secured to the cover body. The magnetic fastener is configured to provide a magnetic force to keep the magnetic fastener selectively secured to the metallic component of the grill so as to keep the cover body in place around the grill therein.

A second embodiment of the invention is broadly directed to a grill cover configured to be utilized with a grill having a metallic component, the grill cover comprising a cover body, a magnetic fastener, and a secondary fastener. The cover body presents an outer edge disposed along a bottom side and a cover void therein configured to receive the grill therein. The magnetic fastener is secured to the cover body. The magnetic fastener is configured to provide a magnetic force to keep the magnetic fastener selectively secured to the metallic component of the grill so as to keep the cover body in place around the grill therein. The secondary fastener is also secured to the cover body. The secondary fastener is configured to reduce a cross-sectional area of the cover void so as to prevent the grill cover from being removed from the grill while the secondary fastener is emplaced.

A third embodiment of the invention is broadly directed to a method of manufacturing a grill cover. The method comprises steps of acquiring a polyester fabric; coating the polyester fabric with a protective coating; cutting the polyester fabric to a pattern shape; sewing the polyester fabric to form a cover body; inserting a magnet into a pocket; sealing the magnetic component into the pocket; and securing the pocket to the cover body to form the grill cover.

Additional embodiments of the invention may be directed to a combination grill and grill cover, wherein the grill cover includes the discussed magnetic fastener. Still other embodiments of the invention may be directed to a magnetic fastener configured to be added to an existing grill cover. Yet other embodiments of the invention may be directed to a method of emplacing and removing a grill cover over a grill. Yet still other embodiments will be discussed herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in, nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

Figure 1:
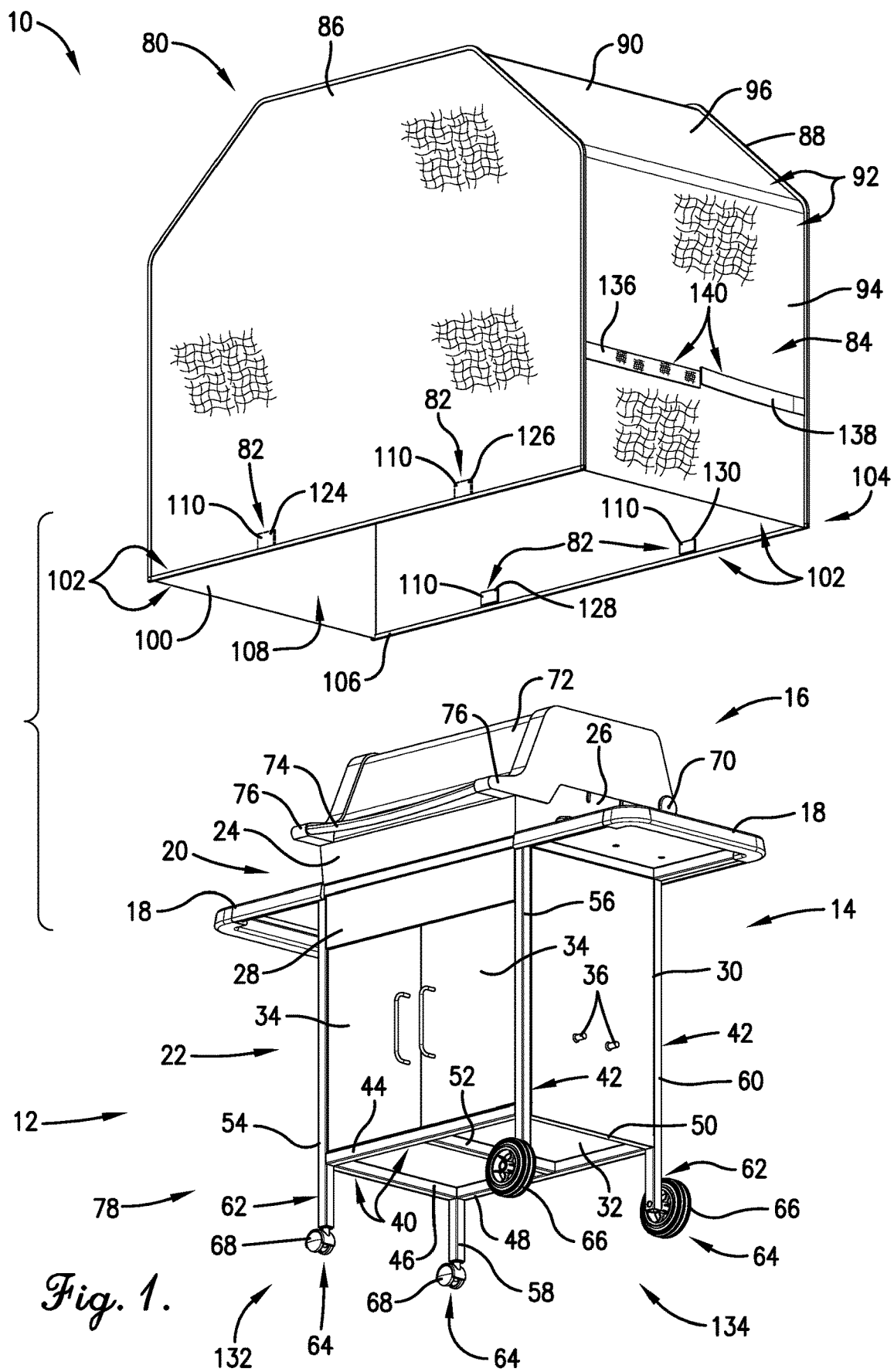
FIG. 1 is a perspective view of a grill cover depicted along with a grill over which the grill cover is configured to be emplaced.

The Figures depict exemplary embodiments for purposes of illustration only. One skilled in the art will readily recognize from the following discussion that alternative embodiments of the systems and methods illustrated herein may be employed without departing from the principles of the invention described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments. For instance, the drawing figures do not limit the present invention to the specific embodiments disclosed and described herein. Furthermore, directional references (for example, top, bottom, up, and down) are used herein solely for the sake of convenience and should be understood only in relation to each other. For instance, a component might in practice be oriented such that faces referred to as "top" and "bottom" are sideways, angled or inverted relative to the chosen frame of reference. Use of directional terms such as "upper," "lower,", "top", "bottom", "above," "below", "front", "forward", "left" or "right", and etc. are intended merely for orientation, to describe the positions and/or orientations of various components relative to one another, and are not intended to impose limitations on any position and/or orientation of any embodiment of the invention relative to any reference point external to the reference.

Exemplary Environment

Embodiments of the invention are directed to a grill cover 10. As discussed above, grill covers 10 are utilized to provide protection for a grill 12 or other outdoor cooking equipment. Because the grill 12 typically spends most time out of doors, the grill 12 is exposed to weather and other environmental factors to which other indoor cooking equipment is not exposed. Examples of this weather can include high winds and rains. Rain and other precipitation can damage the grill 12 over time. The high winds can typically dislodge the grill cover 10 that is otherwise protecting the grill 12, thus exposing the grill 12 to water damage (and often blowing the grill cover 10 away from the immediate area.

Turning to FIG. 1, an exemplary grill 12 is shown in relation to a grill cover 10. Before discussing the grill cover 10 in detail, the grill 12 will be briefly described so as to orient the reader to an exemplary environment in which various embodiments of the invention may be utilized. It should be appreciated that the grill 12 discussed herein is only exemplary and that other embodiments of the invention may be configured to be utilized in combination with other grills, outdoor cooking devices, or other devices.

The exemplary grill 12 is a standard grill that may be utilized outside of a home or at some other outdoor location. The grill 12 generally comprises a grill body 14 and a lid 16. The grill 12 may further include one or more lateral protrusions 18. The grill 12 is oriented substantially vertically, such that a standing person can utilize the grill 12.

The grill body 14 includes a cooking segment 20 and a cabinet segment 22. The cooking segment 20 presents a front panel 24 and one or more side panels 26. The cooking segment 20 may also present a back panel (not illustrated). The front panel 24, the back panel, and the side panels 26 surround the heat source and the grill grates. The front panel 24, the back panel, and the side panels 26 provide thermal insulation so as to retain the heat within the cooking segment 20.

In some embodiments, the cabinet segment 22 includes a front panel 28 (which may be unitary with the front panel 24 of the cooking segment 20 or distinct therefrom), one or more side panels 30 (which may be unitary with the respective side panels 26 of the cooking segment 20 or distinct therefrom), a back panel (not illustrated), and a bottom panel 32. The front panel 28 of the cabinet segment 22 may have one or more doors 34 associated therewith. The door 34 may provide access to the interior components of the cabinet segment 22, such as a fuel tank and other cooking accessories. The cabinet segment 22 may also include one or more fuel ports 36 configured to interface with the fuel tank and the cooking element for the transfer of fuel.

The cabinet segment 22 may additionally or alternatively include braces 40 and posts 42. The braces 40 provide horizontal support and the posts 42 provide vertical support. The braces 40 and/or posts 42 may provide structural support so as to support the cooking segment 20 thereon. The braces 40 may include a front brace 44, a left brace 46, a rear brace 48, a right brace 50, and a cross brace 52. The posts 42 may include a front-left post 54, a front-right post 56, a rear-left post 58, and a rear-right post 60. The braces 40 and/or posts 42 may provide an intersection between the respective panels 28,30,32 of the cabinet segment 22. In other embodiments, not illustrated, the cabinet segment 22 may comprise at least one brace 40 and at least one post 42, without any panels.

The cooking segment 20 includes a heat source and grill grates (not illustrated). The heat source produces a flame or other heat which is transferred (typically through conduction) to the grill grates or other cooking surfaces. The cabinet segment 22 is configured to hold a fuel tank (such as a propane tank). Fuel from the fuel tank is burned by the heat source so as to produce the flame or other heat. The cabinet segment 22 may also include one or more legs 62 which may each have a wheel 64 or a foot (not illustrated). The wheel 64 may be a static wheel 66 or a caster wheel 68. Caster wheels 68 pivot about a vertical axis so as to allow for movement in multiple directions. Static wheels 66 rotate only about a horizontal axis so as to allow for movement only in a single direction.

The lid 16 is pivotably attached to the cooking segment 20 at a lid pivot 70. The lid 16 comprises a lid body 72 and a handle 74. The lid body 72 provides thermal insulation so as to retain heat within the cooking segment 20. The lid body 72 covers the cooking segment 20 when in a downward orientation and exposes the cooking segment 20 when in an upward orientation. Thus, the user may selectively cover the cooking segment 20 to retain heat during cooking and expose the cooking segment 20 to add, move, flip, or remove the food during the cooking process. The handle 74 is physically separated by the lid body 72, such as via one or more thermally insulating lid arms 76. The lid arms 76 prevent the handle 74 from becoming excessively heated during normal operation. The handle 74 is presented adjacent to the front panel 24 such that the user may grasp and lift the handle 74 so as to move the lid 16 to the upward orientation.

In embodiments of the invention, the grill cover 10 is configured to be utilized with a grill 12 having a metallic component 78, more specifically a ferromagnetic component. The grill cover 10 includes a magnet that is configured to selectively secure to the ferromagnetic component of the grill 12. In some embodiments, the ferromagnetic component is the front brace 44 and the rear brace 48. In some embodiments, the ferromagnetic component is the front-right post 56, the front-left post 54, the rear-right post 60, and the rear-left post 58. In some embodiments, the ferromagnetic component is the front brace 44. In some embodiments, the ferromagnetic component is the rear brace 48. In some embodiments, the ferromagnetic component is at least one door 34. In some embodiments, the ferromagnetic component is the back panel of the cabinet segment 22.

Embodiments of the invention may be directed to the covering of any of various types of grills. These include, but are not limited to, residential built-in grills, restaurant grills, commercial grills, food truck grills, competition grills, portable grills, and other grills. Embodiments of the invention may be directed to covering of any of various other types of outdoor cooking equipment. These include, but are not limited to, drum-style smokers, bullet-style smokers, vertical smokers, horizontal smokers, off-set smokers, cabinet-style smokers, egg-style smokers, outdoor pizza ovens, or other types of devices. Embodiments of the invention may be directed to covering other types of outdoor equipment. These include, but are not limited to, tools, structures, outdoor furniture, fire pits, space heaters, and the like. It should be appreciated that the above discussed devices and uses are only exemplary.

Exemplary Grill Cover

The grill cover 10 is configured to be disposed over the grill 12 described above. The grill cover 10 is configured to be selectively secured to the grill 12, as discussed below. The grill cover 10 provides a protective barrier between the grill 12 and the exterior environment, which is typically an outdoor environment.

In embodiments, the grill cover 10 broadly comprises a cover body 80, a primary fastener 82, and a secondary fastener 84. The primary fastener 82 attaches to the grill 12 automatically so as to at least temporarily hold the grill cover 10 in place over the grill 12. The secondary fastener 84 is secured subsequently to provide additional securement of the grill cover 10 to the grill 12.

The cover body 80 of embodiments comprises an anterior panel 86, a posterior panel 88, and a traversing panel 90. The anterior panel 86 is configured to be aligned with the front panel 24 of the grill 12. The posterior panel 88 is spaced apart from the anterior panel 86 via the traversing panel 90. The traversing panel 90 keeps a spacing between the anterior panel 86 and the posterior panel 88. The grill 12 fits within the spacing, such that the grill cover 10 substantially surrounds the grill 12.

The anterior panel 86 and posterior panel 88 of embodiments each present a shape generally complementary to a shape presented by the grill 12. In some embodiments, the anterior panel 86 and the posterior panel 88 each present a beveled rectangular shape, in which the top two corners of the rectangle are beveled, as best shown in FIG. 1. This shape may additionally or alternatively be described as a hexagon having two right angles on a lower side. In other embodiments, the anterior panel 86 and the posterior panel 88 may each present another shape configured to be utilized in conjunction with a grill 12 of another shape.

It should be appreciated that in some embodiments, the grill cover 10 is substantially symmetrical about a vertical plane, such that the anterior sheet is similar to the posterior sheet. In these embodiments, the cover body 80 may be installed with either the anterior sheet or the posterior sheet aligned with the front panel 24 of the grill 12.

The traversing panel 90 is disposed between the anterior sheet and the posterior sheet. In some embodiments, the traversing panel 90 comprises a set of sub-panels 92. The sub-panels 92 may include a right sub-panel 94, a top-right sub-panel 96, a top sub-panel 98 (shown in FIG. 2), a top-left sub-panel (not directly illustrated), and a left sub-panel 100 (shown in FIG. 1). The sub-panels 92 may be unitary, such that the sub-panels 92 are defined by an angle at which the sub-panel is secured relative to the anterior panel 86 and/or the posterior panel 88. The traversing panel 90 may be secured to the anterior panel 86 and/or the posterior panel 88 via stitching. Alternatively, the traversing panel 90 may be secured to the anterior panel 86 and/or the posterior panel 88 via a chemical adhesive. In still other embodiments, the traversing panel 90 may be monolithic with the anterior panel 86 and/or the posterior panel 88.

Figure 2:
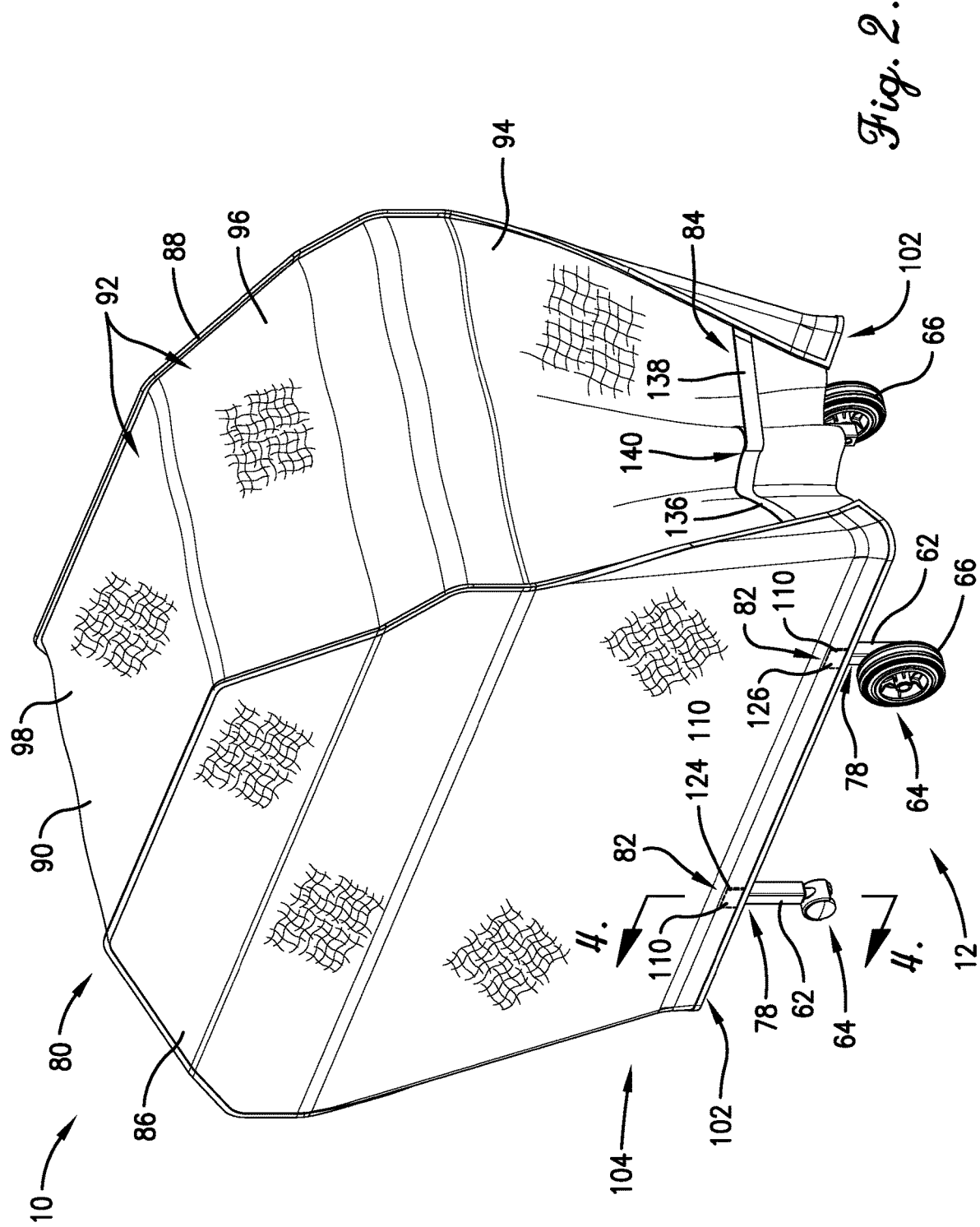
FIG. 2 is a perspective view of the grill cover emplaced over the grill.

The cover body 80 of embodiments presents an outer edge 102 disposed along a bottom side 104. The outer edge 102 includes a lower side of the anterior panel 86, two lower sides of the traversing panel 90, and a lower side of the posterior panel 88. As can be best seen in FIG. 1, the outer edge 102 presents a generally rectangular shape about a horizontal cross-section. The outer edge 102 is at least large enough to fit over the grill 12 (as shown in FIG. 1) such that it may be reduced so as to stay in contact with the grill 12 (as shown in FIG. 2).

Figure 4:
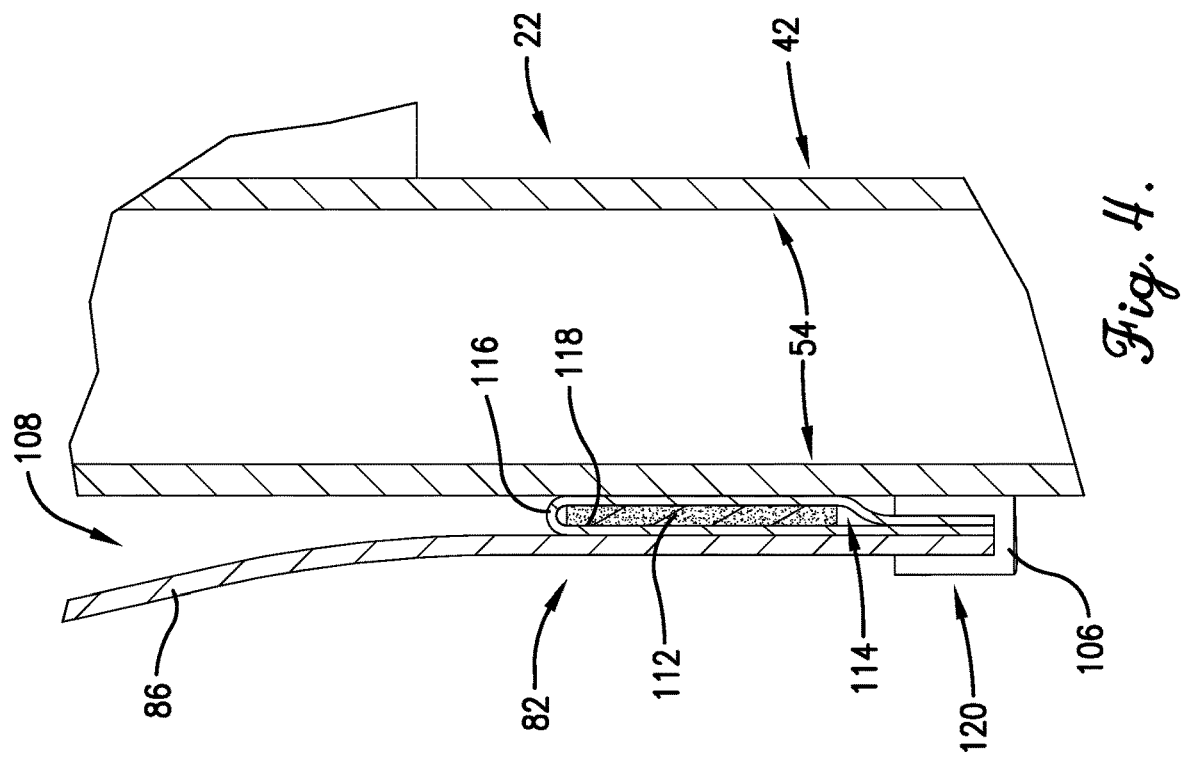
FIG. 4 is a vertical cross-section view of the magnet of the grill cover secured to the grill.

The outer edge 102 may include a facing 106, as best illustrated in FIG. 4. The facing 106 is a distinct fabric segment that is disposed over the outer edge 102 of the cover body 80. The facing 106 is sewn over the outer edge 102 to protect the outer edge 102 from raveling. In some embodiments, the facing 106 is a continuous fabric segment. In other embodiments, the facing 106 is distinct for each of the panels 86,88,90 of the cover body 80. In other embodiments of the invention, not illustrated, the outer edge 102 of the cover body 80 is hemmed or otherwise terminated. In still other embodiments, also not illustrated, the outer edge 102 is hemmed in addition to the facing 106 disposed thereon, The cover body 80 presents a cover void 108 therein configured to receive the grill 12 therein. The cover void 108 is defined by the outer edge 102 and the interior of the cover body 80. The void is reduced once the grill cover 10 is disposed over the grill 12, as shown in FIG. 2. The void is reduced through the primary fastener 82 and/or secondary fastener 84 constricting the outer edge 102, so as to prevent the outer edge 102 from being removed up and over the grill 12, as discussed below.

In embodiments of the invention, the grill cover 10 includes a magnetic fastener 110 secured to the cover body 80 so as to act as a primary fastener 82 of the cover body 80 to the grill 12. The magnetic fastener 110 may be disposed along the outer edge 102 of the cover body 80 (as shown in FIGS. 1 and 3), such that the magnetic fastener 110 will be disposed near the bottom side 104 when the grill cover 10 is emplaced over the grill 12 (as shown in FIG. 2).

The magnetic fastener 110 is configured to provide a magnetic force to keep the magnetic fastener 110 selectively secured to the metallic component 78 of the grill 12 so as to keep the cover body 80 in place around the grill 12 therein. The magnetic fastener 110 being secured to the grill 12 is best shown in FIG. 4. It should be appreciated that the magnetic fastener 110 will adhere to the grill 12 without being directly applied in many instances. As the grill cover 10 is place over the grill 12, as discussed below, the magnetic fastener 110 will automatically adhere to the metallic component 78 of the grill 12, without being directly adhered by the user.

In embodiments of the invention, the magnetic fastener 110 comprises a magnet 112 and a pocket 114. The pocket 114 is secured to the cover body 80, and the magnet 112 is disposed within the pocket 114. The pocket 114 and the magnet 112 are best illustrated in FIGS. 3 and 4. As can be seen, the pocket 114 is disposed along the outer edge 102. As best shown in FIG. 1, the pocket 114 is disposed at least partially within the cover void 108. Disposing the pocket 114 within the cover void 108, as opposed to external to the cover body 80, increases the magnetic force applied by the magnet 112 on the metallic component 78 of the grill 12.

Figure 3:
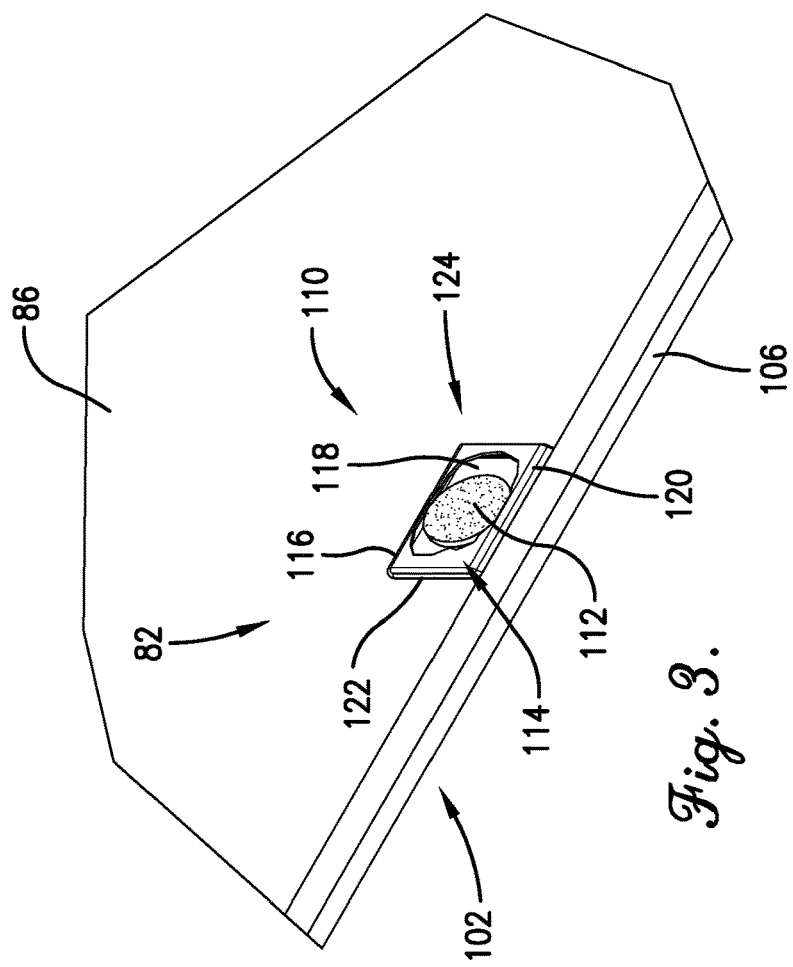
FIG. 3 is a sectional view showing a magnet of the grill cover.

The pocket 114 is best shown in FIGS. 3 and 4. The pocket 114 of embodiments presents a generally rectangular shape. The pocket 114 comprises a pocket sheet 116 that is folded so as to present a pocket void 118. The pocket sheet 116 may be folded (as shown in FIG. 4) or otherwise secured so as to form a cover-side sheet and a grill-side sheet. The pocket void 118 is disposed between the cover-side sheet and the grill-side sheet. The pocket void 118 has the magnet 112 permanently disposed therein. In some embodiments, the pocket sheet 116 is distinct from the respective panel 86,88,90 of the cover body 80. In other embodiments, the pocket 114 is formed of a sheet that is unitary with at least a portion of the cover body 80. In these embodiments, the pocket 114 is formed by folding a protrusion of the cover body 80.

In embodiments of the invention, best shown in FIG. 4, the pocket 114 is secured via the facing 106. The facing 106 surrounds the respective panel 86,88,90, the cover-side sheet, and the grill-side sheet. A seam 120 is disposed through an exterior side of the facing 106, the respective panel 86,88,90, the cover-side sheet, the grill-side sheet, and an interior side of the facing 106. Thus, the pocket 114 is secured to the cover body 80 by a seam 120 along the outer edge 102 of the cover body 80.

In some embodiments, the pocket 114 is movable independent of the cover body 80. This independent movability allows the pocket 114 to fall inward (e.g., toward the grill 12). Falling inward places the magnet 112 disposed within the pocket 114 nearer to the grill 12. This allows an increased likelihood that the magnet 112 will automatically secure to the metallic component 78 of the grill 12.

The magnet 112 is permanently disposed within the pocket 114. The pocket 114 may thus include side seams 122 to secure the cover-side sheet to the grill-side sheet. The side seams 122 are best shown in FIG. 3. The magnet 112 may thus be inserted into the pocket 114 before the side seam 122 and/or the bottom seam is secured. This permanently secures the magnet 112 within the pocket 114, such that the magnet 112 is not removable during normal operation of the grill cover 10.

The magnet 112 is a material or object that produces a magnetic field. The magnetic field produces a force that pulls on other ferromagnetic material, such as the metallic component 78 of the grill 12 discussed above. In embodiments, the magnet 112 is a permanent magnet which creates its own persistent magnetic field. In embodiments, the magnet 112 presents a generally flat cylindrical shape, as shown in FIG. 3. In other embodiments, the magnet 112 may present a rectangular shape, a square shape, an elliptical shape, or some other shape.

In embodiments of the invention, the grill cover 10 includes a set of magnetic fasteners 110. The set of magnetic fasteners 110 are disposed on the cover body 80. In these embodiments, the above-discussed magnetic fastener 110 is a first magnetic fastener 124 and the grill cover 10 further comprises a second magnetic fastener 126, a third magnetic fastener 128, and a fourth magnetic fastener 130. An example of this embodiment is best shown in FIG. 1.

In some of these embodiments, as shown in FIG. 1, the first magnetic fastener 124 and the second magnetic fastener 126 are disposed on the anterior panel 86 of the cover body 80, and the third magnetic fastener 128 and the fourth magnetic fastener 130 are disposed on the posterior panel 88 of the cover body 80. The first magnetic fastener 124 is laterally spaced from the second magnetic fastener 126 so as to interface with the metallic component 78 of the grill 12 along a left side 132 and a right side 134. The third magnetic fastener 128 is laterally spaced from the fourth magnetic fastener 130 so as to interface with the metallic component 78 of the grill 12 along the left side 132 and the right side 134.

It should be appreciated that the metallic component 78 of the grill 12 interfaced by the respective magnetic fasteners 110 may be distinct, depending upon the construction of the grill 12 over which the grill cover 10 is emplaced. Thus, the grill 12 may include a first metallic component 78, a second metallic component 78, a third metallic component 78, and/or a fourth metallic component 78. The metallic component 78 may be any of the above-discussed braces 40, posts 42 42, panels 28,30,32, doors 34, etc. Thus, in some instances, the first magnetic fastener 124 and the second magnetic fastener 126 are configured to secure to the first metallic component 78 of the grill 12, and the third magnetic fastener 128 and the fourth magnetic fastener 130 are configured to secure to the second metallic component 78 of the grill 12. As an example, the first metallic component 78 may be the front brace 44 of the cabinet segment 22 and the second metallic component 78 may be the rear brace 48 of the cabinet segment 22. As another example, the first metallic component 78 may be the front-left post 54 (as shown in FIG. 4), the second metallic component 78 may be the front-right post 56, the third metallic component 78 may be the rear-left post 58, and the fourth metallic component 78 may be the rear-right post 60. FIG. 4 shows the first metallic component 78 being the front-left post 54 being secured to the magnet 112 through the pocket 114, which is secured to the front panel 24 of the cover body 80 via the facing 106.

In other embodiments, the grill cover 10 includes the cover body 80, a first magnetic fastener 124, and a second magnetic fastener 126, with both magnetic fasteners 110 disposed along the outer edge 102 of the cover body 80. In still other embodiments, the grill cover 10 includes the cover body 80, a first magnetic fastener 124, and a second magnetic fastener 126; with the first magnetic fastener 124 being disposed along the outer edge 102 and the second magnetic fastener 126 being disposed on the traversing panel 90 away from the outer edge 102. In these embodiments, the second magnetic fastener 126 is configured to be secured to the lid 16 or other second metallic component 78 of the grill 12.

In embodiments of the invention, the grill cover 10 includes at least one secondary fastener 84. The secondary fastener 84 is configured to be secured and/or tightened by the user after the primary fastener 82 has been secured to the grill 12. The primary fastener 82 and the second fastener thus work together to keep the grill cover 10 emplaced over the grill 12. In embodiments, the secondary fastener 84 reduces the cross-sectional area of the void opening of the cover body 80, as best seen by comparing FIG. 1 to FIG. 2.

In some embodiments of the invention, the secondary fastener 84 includes an anterior strap 136 and a posterior strap 138. The anterior strap 136 and the posterior strap 138 are each provided with a hook-and-loop fastener 140 (commonly referred to as VELCRO), such that the anterior strap 136 remains secured to the posterior strap 138 via the hook-and-loop fastener 140. The user may thus emplace the grill cover 10 over the grill 12 such that the primary fasteners 82 engage one or more metallic components 78 of the grill 12, and then the user may tighten or otherwise secure the secondary fastener 84 to provide additional securement of the grill cover 10 over the grill 12, as is shown in FIG. 2. In other embodiments of the invention, the secondary fastener 84 may include another fastening structure, such as a loop, a button, a clip, an eyelet, or the like.

Exemplary Materials and Methods of Manufacture

The materials used and methods of manufacturing various embodiments of the invention will now be discussed. It should be appreciated that any of various materials and methods of manufacture may be utilized in producing any of the various embodiments of the invention. Broadly, embodiments of the invention are directed to a method of manufacturing a grill cover 10. The method may comprise steps of acquiring a polyester fabric; coating the polyester fabric with a protective coating; cutting the polyester fabric to a pattern shape; sewing the polyester fabric to form a cover body 80; inserting a magnet 112 into a pocket; sealing the magnet 112*ic* component into the pocket; and securing the pocket to the cover body 80 to form the grill cover 10.

In embodiments of the invention, the cover body 80 is formed of polyester fabric. Polyester fabric is formed at least partially of polyester yarns or fibers. Polyester is a synthetic, man-made polymer such as polyethylene terephthalate ("PET"). Polyester fabrics are typically durable and resistant, as well as strong yet lightweight. Polyester fabrics also have quick drying properties, which makes them ideal for outdoor applications. The pocket and the secondary fasteners 84 may additionally be formed at least partially of polyester fabric. The base, untreated polyester fabric may be referred to as greige. The polyester fabric may be provided in any of various grades, such as good, better, best, and premium.

In embodiments of the invention, the polyester material is coated so as to provide additional weatherproofing characteristics to the polyester material. The coated polyester material may be referred to as a vinyl coated polyester. The vinyl coated polyester includes the polyester fabric (the griege, which may also be referred to as a polyester scrim), a bonding or adhesive agent, and a polyvinyl chloride ("PVC") coating. The polyester material supports the coating. The PVC coating makes the polyester material waterproof and resistant to environmental factors. In other embodiments, the polyester material may be treated with another coating. Examples of the coating include polyester urethane ("PU"), polyether urethane ("PE"), and thermoplastic elastomer ("TPE") coatings. The coating is typically applied to the griege in a liquid form and allowed to cure.

The finished rolled vinyl coated polyester (or other finished rolled polyester fabric) is then cut and sewn. The rolled vinyl coated polyester is laid out on a cutting board and cut the patterns out for the specific grill cover 10 shape and size. Examples of grill shapes include the one depicted in FIGS. 1 and 2, wagon, smoker, kettle, and other of the above-discussed outdoor cooking equipment. Examples of grill cover sizes include small ("S"), medium ("M"), large ("L"), extra-large ("XL").

The cut patterns are then sewn together. For example, the traversing segment is sewn to the anterior panel 86 and the posterior panel 88. The additional items are also sewn to the cover body 80. For example, the pocket may be sewn shut with the magnet 112 therein, and the facing 106 sewn to the pocket and the respective panel 86,88,90 of the cover body 80. The cover, once sewn and put through a quality control process, is packed into the retail packaging.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claim(s) set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in the paragraph shall apply unless so stated in this description and/or except as will be readily apparent to those skilled in the art from the description.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

I claim:

1. A grill cover configured to be utilized with a grill having a metallic component, the grill cover comprising:
    a cover body presenting an outer edge disposed along a bottom side,
    wherein the cover body presents a cover void therein configured to receive the grill therein; and
    a magnetic fastener having a bottom edge that is secured to the cover body proximate the bottom side of the outer edge such that the magnetic fastener is configured to pivot relative to the cover body about the bottom edge,
    said magnetic fastener configured to provide a magnetic force to keep the magnetic fastener selectively secured to the metallic component of the grill so as to keep the cover body in place around the grill therein.

2. The grill cover of claim 1, wherein the magnetic fastener includes:
    a pocket secured to the cover body; and
    a magnet permanently disposed within the pocket.

3. The grill cover of claim 2, wherein the pocket is secured to the cover body by a seam along the outer edge of the cover body.

4. The grill cover of claim 2,
    wherein the pocket is formed of a sheet that is distinct of the cover body,
    wherein the pocket is sewn to the cover body via a facing.

5. The grill cover of claim 1,
    wherein the magnetic fastener is a first magnetic fastener, the grill cover further comprising:
    a second magnetic fastener;
    a third magnetic fastener; and
    a fourth magnetic fastener.

6. The grill cover of claim 5,
wherein the cover body includes an anterior panel, a posterior panel, and a traversing panel,
wherein the first magnetic fastener and the second magnetic fastener are disposed on the anterior panel of the cover body,
wherein the third magnetic fastener and the fourth magnetic fastener are disposed on the posterior panel of the cover body.

7. The grill cover of claim 5,
wherein the metallic component of the grill is a first metallic component,
wherein the first magnetic fastener and the second magnetic fastener are configured to secure to the first metallic component of the grill,
wherein the grill further includes a second metallic component,
wherein the third magnetic fastener and the fourth magnetic fastener are configured to secure to the second metallic component of the grill.

8. A grill cover configured to be utilized with a grill having a metallic component, the grill cover comprising:
a cover body presenting an outer edge disposed along a bottom side,
wherein the cover body presents a cover void therein configured to receive the grill therein;
a magnetic fastener secured to the cover body, the magnetic fastener comprising a pocket and a magnet disposed within the pocket,
said magnetic fastener configured to provide a magnetic force to keep the magnetic fastener selectively secured to the metallic component of the grill so as to keep the cover body in place around the grill therein;
a facing along the outer edge, wherein the pocket is secured to the cover body by the facing; and
a secondary fastener secured to the cover body,
said secondary fastener configured to reduce a cross-sectional area of the cover void so as to prevent the grill cover from being removed from the grill while the secondary fastener is emplaced.

9. The grill cover of claim 8, wherein the pocket is secured to the cover body by a seam along the outer edge of the cover body.

10. The grill cover of claim 8, wherein the pocket is pivotable about the facing relative to the cover body.

11. The grill cover of claim 8,
wherein the pocket is formed of a sheet that is distinct of the cover body.

12. The grill cover of claim 8, wherein the secondary fastener includes:
an anterior strap; and
a posterior strap.

13. The grill cover of claim 12, wherein the secondary fastener includes—
a hook-and-loop fastener configured to securely hold the anterior strap to the posterior strap.

14. A method of manufacturing a grill cover comprising:
coating a polyester fabric with a protective coating;
cutting the polyester fabric to a pattern shape;
sewing the polyester fabric to form a cover body;
inserting a magnet into a pocket;
sealing the magnetic component into the pocket; and
securing a bottom portion of the pocket to the cover body such that the pocket is pivotable relative to the cover body.

15. The method of claim 14, wherein the protective coating applied to the polyester fabric is a PVC coating.

16. The method of claim 14, wherein the step of coating the polyester fabric is performed by—
applying the protective coating in a liquid form; and
allowing the protective coating to cure.

17. The method of claim 14, wherein the step of sealing the magnetic component into the pocket is performed by—
applying a facing around a portion of the cover body as well as the pocket; and
sewing the facing to the cover body and the pocket.

* * * * *